Figure 1:
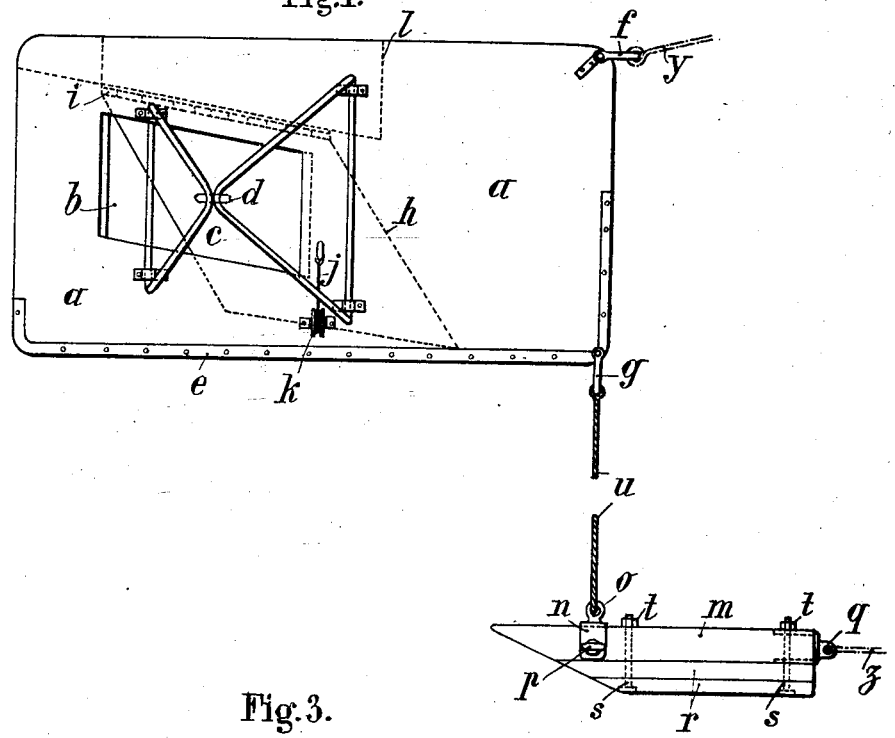

Oct. 20, 1925.

A. V. A. ROBERT 1,557,728

MEANS FOR OPENING FISHING NETS IN WIDTH AND HEIGHT

Filed Feb. 28, 1924   2 Sheets-Sheet 1

INVENTOR:
Alphonse V. A. Robert,
By Chatwin & Co.
Attys

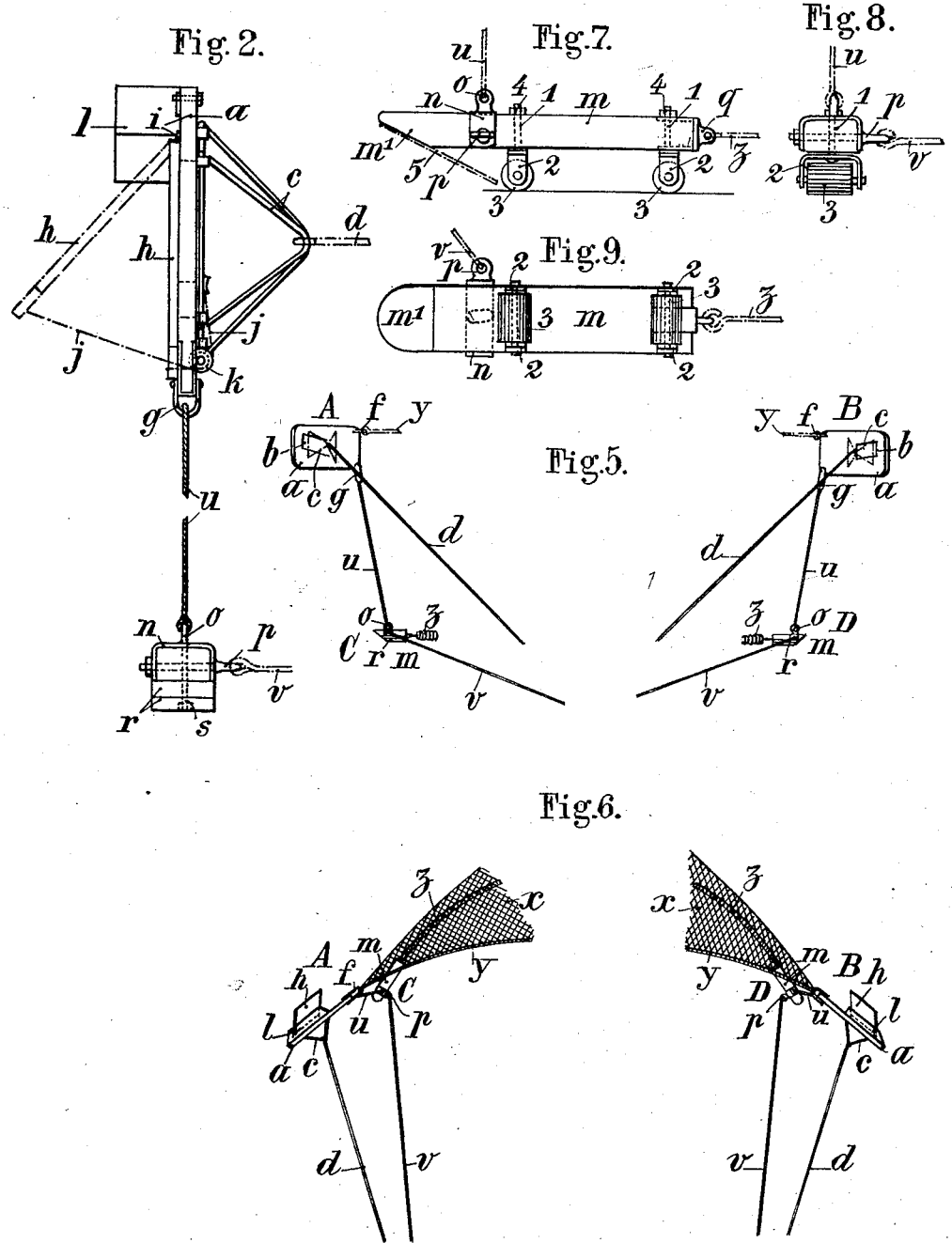

Patented Oct. 20, 1925.

1,557,728

UNITED STATES PATENT OFFICE.

ALPHONSE VICTOR ALEXANDRE ROBERT, OF MORBIHAN, FRANCE.

MEANS FOR OPENING FISHING NETS IN WIDTH AND HEIGHT.

Application filed February 28, 1924. Serial No. 695,831.

*To all whom it may concern:*

Be it known that I, ALPHONSE VICTOR ALEXANDRE ROBERT, a French citizen, and resident of Morbihan, France, have invented a new and useful Improved Means for Opening Fishing Nets in Width and Height, of which the following is a specification.

In maritime fishing one generally applies two methods of steam trawlage; the one method is carried out by the yoke net or "gangui" method which is dragged from the front by two boats, and the other by the trap net or "otter-trawl" drawn by a single boat.

The opening, and consequently the movement of the yoke net or "gangui," is determined, as regards the width, by the distance apart of the two boats and is, as regards the height, by the buoys or floaters. The opening of the trap net or otter-trawl is limited in width by the distance apart of the traps to which the net is attached and in height by the same height of the traps.

Now it frequently occurs that during a strong swell the traps undergo bumping and do not keep an upright position which is necessary to assure to the net an opening corresponding to their height.

On the other hand the resistance opposed to the traction effort by the traps dragging on the bed of sea needs in the case of large trawlers, the intervention of a relatively powerful motive force and in consequence a large consumption of fuel.

The yoke net gives larger yield than the panel net, but this advantage does not compensate for the inconvenience that it presents over the latter and because of the use of two boats instead of one only.

In order to increase the yield of the otter-trawl, arrangements have been proposed in which the nets, instead of being mounted directly on the panels, are distanced from the latter, to which they are connected by lowering arms which assure their opening in width while the opening in height is assured by the floaters, thus similarly to the yoke net. These arrangements appear to give better results than the previous arrangements without nevertheless enlarging the opening of the net in the two directions to a sufficient extent and they have the inconvenience of complicating the handling of the engine.

The present invention relates to an extending apparatus for fishing nets which overcomes the objections above stated, and particularly avoids the use of two boats and by assuring the opening of the nets in width and height to increase the yield in large proportions by regulating the height of the opening which is not limited to that of the panels.

Moreover this arrangement ensures in other ways the maintenance of the opening in the vertical position and in the case of the trawler the compact between the net and the bottom. Further, the arrangement regulates this contact in order to assure the dragging of the net on the bottom for catching flat fish and of avoiding this dragging when catching fish which do not live at the bottom. The wear and tear of the net is thus less rapid and the motive power considerably less.

Figure 3:
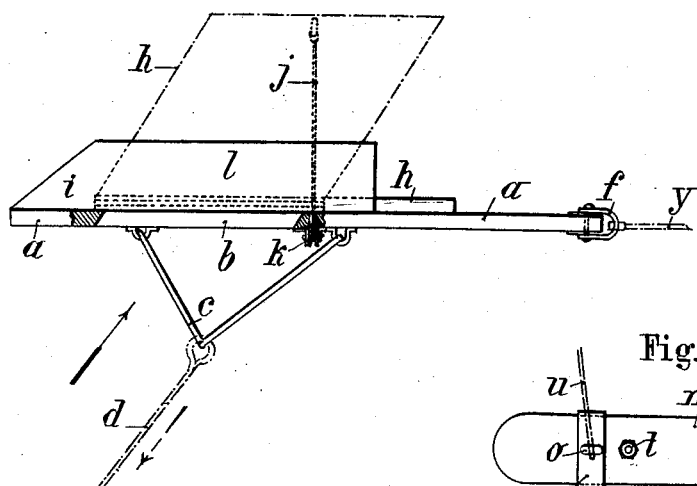
Figure 4:
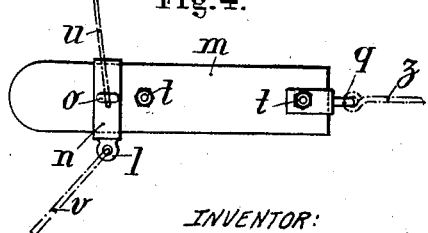

A constructional embodiment of the invention is shown by way of example in the accompanying drawing, in which:

Figure 1 is a front elevation of a panel of the apparatus provided with its removable lead ballast. Fig. 2 is a side view. Fig. 3 shows plan of the same panel. Fig. 4 shows a part plan of the removable ballast. Fig. 5 shows on a smaller scale an elevation of the whole of the two panels which form the apparatus. Fig. 6 shows a corresponding plan. Figs. 7, 8 and 9 show respectively a front elevation a side view and an underside plan of a modified construction of the counterweights.

As indicated in the diagram the apparatus comprises two similar members A and B (Figs. 5 and 6) which are made to be placed symmetrical relative to vertical axis of the whole and connected to the counterweights C and D, disposed in a similar manner below each of the members upon which they exercise their pull in the vertical direction.

Each of the members A and B comprises a wooden panel *a* in which is made a large four sided orifice *b* passing through the horizontal axis of the panel and carried forward of its vertical axis. The two longitudinal parallel sides of this orifice are cut obliquely from front to back. This panel is provided in the usual manner with a double triangular suspension *c*, articulated at the front wall and on which is attached the chain or traction cable *d*, which serves to connect the bracket and the windlass carried by the tug. Metallic bindings *e* (Fig. 1) are appropriately arranged to increase the rigidity and the strength of the said panel, which is further provided with two forks one of which $f$ is articulated at its upper rear corner while the other $g$ is fixed by its lower rear corner. A second panel $h$ articulated with the aid of a hinge $i$ on the rear face of the fixed panel $a$ of which it partly covers the quadrangular orifice $b$. This second panel $b$ is given an angular displacement round its fixed axis by the action of an apron or flow of water passing through the orifice $b$. It is retained by a steel wire $j$ guided by a pulley $k$ mounted on the fixed panel $a$; the length of this wire $j$ whose free end is fixed to the panel, is determined in such a way as to limit and to vary the amplitude of the angular displacement of the panel $h$. Finally an appropriate float $l$ fixed at the upper part of the rear side of the panel $a$, maintains the structure in the vertical position when entering water.

The member is completed by a counterweight $m$, of cast iron or lead, upon which is fixed an iron-hook $n$ shaped into a vertical eye bolt $o$ on the upper surface of the counterweight $m$, and a horizontal eye bolt $p$ on the front face. The counterweight $m$ also carries a third eye bolt $q$ secured on the rear end and it is ballasted by removable sole pieces $r$, of varying number disposed beneath the counterweight $m$, with which they are rendered integral by bolts $s$ furnished with screw $t$ which have their bearings on the upper surface of the counterweight. This latter thus constructed, is connected to the fixed panel $a$, by a cable $u$ attached at one end to the lower eye bolt $q$ of the panel, and the other end to the vertical eye bolt $o$ of the counterweight $m$.

The arrangement, consists, as above stated, of two members similar to that just described and which are placed symmetrically relative to the vertical axis of the whole. Each chain or cable, web-shaped in order to assure the traction, comprises an arm $d$, attached to the double triangular suspension $c$ of each of the panels $a$, and an arm $v$ whose attachment end is formed by the horizontal eye bolt $p$ of the stirrup $n$ of each of the counterweights. The adjustment of these arms is regulated by the height which it is desired to give to the net.

The mounting of the net $x$ is effected by attaching its head cord or float cord $y$ to the higher eye-bolt $f$ of the panels $a$, and its shoulder or ground cord $z$ to the rear eye bolts $q$ of the counterweight. Throwing out of the arrangement into the water and the withdrawal of same is effected in the same manner as for ordinary nets.

The net being arranged as above stated between the two symmetrical members each consisting of a double panel and a counterweight, its distention in width is produced by the traction effort, and the articulated panels, called the depth panels, in opening under the pressure of the apron of water which flows through the orifice of the fixed panel, causing the ascending movement which raises the height of the opening of the net. This height is variable and corresponds to the length of the steel cables $u$ connecting the panels to their respective counterweights, these latter also ensuring the upright position of the whole and, in the case of trawling, the contact with the sea bed.

The numerous advantages presented by the extending device will be readily seen from what has been stated above and which may be applied to all kinds of fishing nets. The height of the opening of the net being no longer subordinate to that of the panels, may be regulated at will and raised to its maximum by regulating the length of the cables $u$ corresponding to the dimensions of the net, which may thus be greatly increased in size.

Moreover, as the apparatus may be ballasted at will, it is easy to effect the adjustment such as that for trawlers and the net more or less touches the bottom according to the nature of the fish it is desired to catch; the resistance being less, there results an appreciable diminution of the wear and tear of the net and in the motive power required, so economizing fuel.

On the other hand, the bumps which are generally caused by a strong swell have no effect on the panels which tend always to rise.

Finally, when shipping the device the two cables and their webbed pieces are pulled by the windlass to the roller of the brackets, the counterweights are drawn up below the panels and are easily shipped; the articulated panels fold down on the other panels and do not hinder the shipping of the apparatus.

When the extending device is to be used on hard sea beds as found, for example, in the North Sea, it is necessary, to reduce the friction of the counterweights and the resistance which they offer to the motive power in order to obtain the maximum return without increasing the consumption of fuel. To do this, the removable sole pieces are replaced by small pulleys or rollers called "diabolos" which are lighter than the sole pieces and are intended to roll on the sea bed.

In this case, the sole pieces $r$, which were fixed below the counterweights $m$, are removed, as well as the bolts which hold them, and these latter are replaced by the bolts $l$ as shown in Figs. 7 to 9, of the same diameter but shorter. At the lower extremity of each of two bolts $l$ is secured a bracket 2 which is level with the underside of the counterweight and which carries the axle of a pulley or roller 3 called a "diabolo". The whole formed by the bolt 1, bracket 2 and the diabolo 3 is held in position by a nut 4 which is screwed on to the screw thread of the bolt and bearing on the upper surface of the counterweight.

One can see the advantage which is realized, in fishing on hard sea beds where it is necessary to use light extending devices, by replacing the removable sole pieces of the counterweights with rollers designed to cause, owing to their rotation, a minimum friction and, consequently, resistance to traction, which advantage added to and combining with those which are gained by the elements constituted, as hereinbefore described by a fixed panel and by a movable panel forming a depth rudder and stabilizer.

There results an appreciable economy in the consumption of fuel the cost of which corresponds to the motive power to be furnished, and also a better yield to that from other existing arrangements.

On the other hand, the angle of the oblique section $m^1$ of the side face of the counterweight $m$ is formed so as to be extended by an iron protecting plate 5 intended to prevent the introduction of hard foreign bodies in the rotary members of the rollers, which bodies might oppose the forward movement of the said rollers in the direction of traction, as indicated in dot and dash lines in Fig. 7.

It is understood that the arrangement is given only by way of example, and that the details of working, accessories, materials and dimensions may vary according to requirements without deviating from the principle of the invention.

When it is especially required to use the improved arrangement for very deep nets, the arms $v$ of the webbed portion, used for dragging the counterweights $m$ are suppressed and, in order to ensure a better traction, the head cable is secured to the lower extremity of the panels $h$ forming depth rudder. The counterweights are then dragged by their respective panels. These latter thus drag along the whole net whose points of attachment on the said panels vary with the weight of the net and the kind of fishing to be carried out.

I claim:

1. A device of the character described comprising a pair of symmetrically disposed panels, counterweights, cables adjustably connecting the panels and the counterweights, a net disposed between the panels, cables connecting the panels to the head rope of the net and the counterweights to the ground rope of the net; each of said panels having a quadrangular orifice, the transverse sides of the orifice being parallel to those of the panel and the longitudinal sides being at inclination to those of the panel, this arrangement of the elements constituting means for keeping the nets opened both in width and height when the net is being trawled.

2. A device of the character described comprising a pair of fixed symmetrically disposed panels, counterweights, cables adjustably connecting the panels and the counterweights, a net disposed between the panels, cables connecting the panels to the head rope of the net and the counterweights to the ground rope of the net, each of said panels having a quadrangular orifice, the transverse sides of the orifice being parallel to those of the panel and the longitudinal sides being at inclination to those of the panel, this arrangement of the elements constituting means for keeping the nets opened both in width and height when the net is being trawled, an articulation on the rear side of the fixed above panels and parallel to the upper inclined side thereof, an adjustable lozenge-shaped panel hung upon said articulation, a cable connecting the lozenge-shaped panel and the front face of the fixed panel, this constituting means for balancing and regulating the depth of the net, as stated.

ALPHONSE VICTOR ALEXANDRE ROBERT.